United States Patent [19]
Ries

[11] 4,119,132
[45] Oct. 10, 1978

[54] SKID PREVENTION DEVICE FOR TIRES
[76] Inventor: Gottfried Ries, Freiburger Str. 19, 7517 Waldbronn-Reichenbach, Fed. Rep. of Germany
[21] Appl. No.: 777,498
[22] Filed: Mar. 14, 1977
[30] Foreign Application Priority Data
Mar. 12, 1976 [DE] Fed. Rep. of Germany ........ 2610346
[51] Int. Cl.² .............................................. B60C 11/00
[52] U.S. Cl. .................................. 152/208; 152/210; 152/211
[58] Field of Search ........... 152/208, 210, 219, 225 R, 152/211–212, 167–168

[56] References Cited
U.S. PATENT DOCUMENTS

| 1,399,556 | 12/1921 | Hill | 152/211 |
|---|---|---|---|
| 2,696,864 | 12/1954 | Crooker | 152/210 |
| 2,888,057 | 5/1959 | Hildebrant | 152/210 |
| 3,167,280 | 1/1965 | Stokes | 152/211 |

FOREIGN PATENT DOCUMENTS

| 1,197,341 | 7/1965 | Fed. Rep. of Germany | 152/208 |
|---|---|---|---|
| 2,439,519 | 2/1976 | Fed. Rep. of Germany | 152/210 |
| 155,200 | 4/1956 | Sweden | 152/208 |

Primary Examiner—Albert J. Makay
Assistant Examiner—Lawrence E. Williams
Attorney, Agent, or Firm—Allison C. Collard; Thomas M. Galgano

[57] ABSTRACT

A skid prevention device for tires, which tires are provided with longitudinally- and radially-extending rows of treads separated by discrete, laterally-extending rows of recesses, includes a plurality of elongated, generally U-shaped metal claws disposed within the rows of the recesses of the tire, the outer ends of which have spikes secured thereto, and the inner ends of which are pivotably supportable in the recesses of the tire. The device also includes means for pivotably mounting the inner ends of the claws in the recesses of the tire for movement between an extended position, in which the claws are pivoted upwardly with their spikes extending radially outwardly beyond the upper surface of the treads of the tire, and a retracted position, in which the claws are pivoted downwardly with their spikes lying below the upper surface of the treads of the tire. In addition, the device includes means for pivotably moving the claws between the extended and retracted positions thereof.

17 Claims, 21 Drawing Figures

SKID PREVENTION DEVICE FOR TIRES

The present invention relates to a device for preventing skidding by motor vehicle tires, particularly on snow-covered and ice-covered roads, paths, and terrains.

One of the best known means for preventing skidding for tires of motor vehicles is to apply chains on the wheels, a task which is painstaking and difficult. Moreover, the chains have to be removed afterwards to prevent their destruction. Spikes can also be applied to the treads, and act only when the roads are icy, but are practically useless in deep snow.

Furthermore, spikes damage the road surface when it is dry without a snow or ice cover, so that in some areas, they are prohibited by law. On the other hand, removable snow chains diminish the efficiency of driving when the roads are dry, so that they may only be used practically when the roads are covered with ice or snow, and have to be removed when they are not.

For these reasons, it would be advantageous to create a tire for vehicles, wherein a skid prevention means could be applied to the tire automatically, by remote control only when needed, and could be removed again when the road is dry and solid. Such a device will travel on a dry and solid surface just as quietly and uniformly as a normal tire, without damaging the surface of the road. In case there is suddenly a slippery patch of ice, packed snow, or a strong precipitation of snow occurs, such a device will cause immediate protection against skidding.

German Pat. No. 1 197 341 describes such a device for the prevention of tire skidding, where cleats are connected to the center portion of slip protective bands, which are distributed uniformly upon the circumference of the tire, the bands being disposed in recesses which are disposed across or oblique to the surface of the tire. The slip protective bands are capable of being longitudinally moved so that in both terminal positions of the tire-protective bands, the brake cleats are disposed either within, or outside the area of the acting surface of the tire.

This known device has the disadvantage that the bands cannot be easily moved while driving, and that they are practically unmovable when the vehicle is stopped and if the tire stands accidentally upon the sliding path of a band.

Furthermore, devices have been disclosed where spikes or cleats are pushed out or pulled in by air cushions within the tire. These devices are rather complicated and do not guarantee any reliability in operation.

The present invention creats a skid prevention device, where the skid protection means may be actuated while driving so that they act upon the road surface, and can be completely removed when the roadway surface is dry and solid while the vehicle is in motion.

In the present invention, bent, vane or scoop-shaped metal plates with steel or hard metal points called claws are disposed over the entire tread of the tire. The claws are pivotable, and hinged and may be erected automatically by regulated pulling means above the normal tread. The claws may be retracted and pivoted underneath the level of the tread when not in use.

The claws can be made to completely disappear within the tire body when not in use. For this purpose, special tires may be manufactured. It is also possible to change normal snow tires by leaving out some of the cleats so that the skid protective device may be extended over the entire tire and the claws may be actuated accordingly.

The pivotable metal parts may be furthermore vulcanized onto rubber parts which almost completely fill the recesses after the metal parts are flipped over. When the protruding claws are not used the tire profile is completely smooth so that one may drive very quietly and fast.

In one particular embodiment, metal bottom sheets may be provided in the recesses of the tire surface on which the claws are held by steel cables running radially and vertically over the profile of the tire. The cables are also fastened onto steel cable bands which run laterally along the tire and are capable of being tightened. This causes a reinforcement of the tire comparable to a steel reinforced tire, so that the vehicle may be run at maximum speed when the claws are not in use. The claws are also held by steel cables when flipped over. The cables are fastened under these conditions into clamps or stops.

The claws are fastened to the bottom metal plates by hinges or other linkages, so that a pull of steel cables will make them erect as needed. These steel cables are moved to and fro on both sides of the tire by lever-like metal parts which are fulcrumed on tension straps. The sheet metal parts possess unequally large lever arms in order to ease the transfer of power. The wire cables are fastened to the shorter lever arms, and two slip rings running around the entire wheel are fastened to longer lever arms. Alternatively, one of the slip rings is braked during driving by a normal brake system, an action which transfers a definite motion upon the levers, wire cables and claws.

Other objects and features of the present invention will become apparent from the following detailed description when taken in connection with the accompanying drawings which disclose several embodiments of the invention. It is to be understood that the drawings are designed for the purposes of illustration only, and are not intended as a definition of the limits and scope of the invention disclosed.

Figure 1:
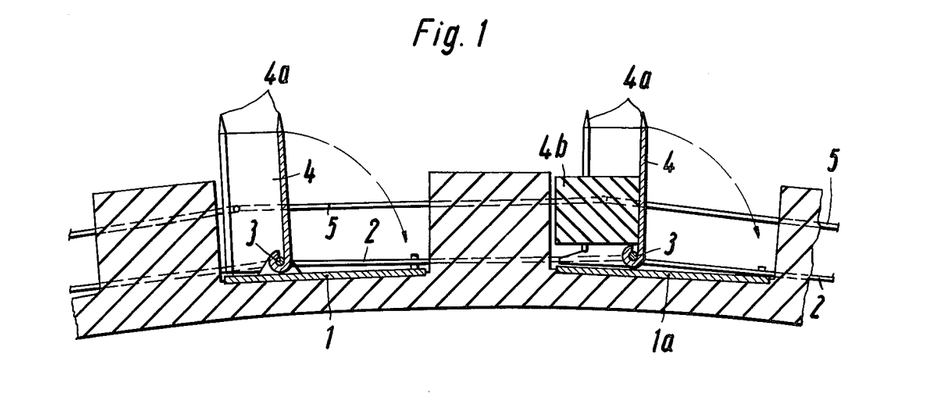
FIG. 1 is a side view partly in section, of a coarsely-treaded snow tire with two erected claws in elevation, according to the invention.
Figure 3:
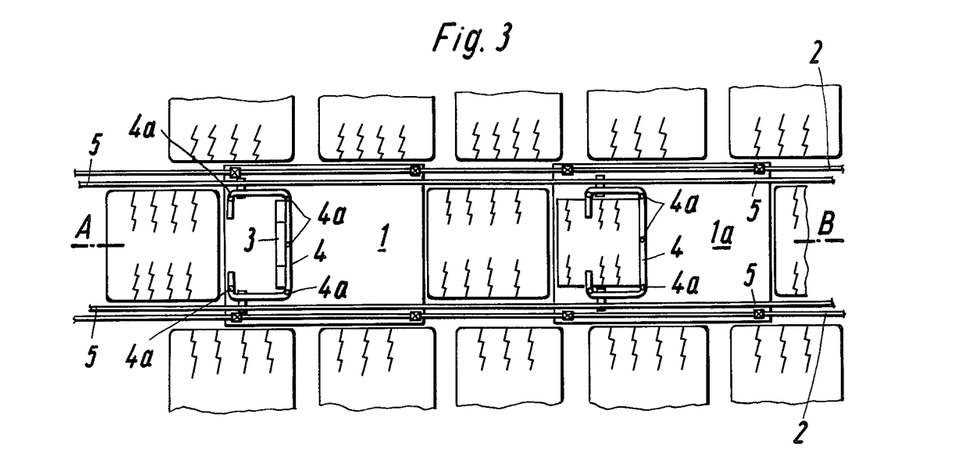
FIG. 3 is a top view of the profile of a tire with both claws of FIG. 1 in an extended state.

Referring to FIG. 1, there is shown a section of a part of the tire profile with two skid protection claws 4 which is taken along line A–B of FIG. 3. The bottom plates 1 and 1a, fabricated from strong sheet metal are disposed in discrete recesses of the tire, and are held by wire cables 2 which are fastened to them, and which are stretched tightly over the whole tread of the tire. The claws 4 which have a generally right angle U-shaped cross-section, are fabricated from rectangularly bent, strong sheet metal and are fastened to bottom plates 1 and 1a by hinges 3. Spikes 4a, fabricated from a hard metal, may be fastened to the claws 4. The claws 4 must have sufficient width so that when they are in their retracted position, they do not pivot upwardly, even at large starting pressures. Their outwardly-disposed longitudinal side also serving as means for improved track adhesion. When in an extended position, the claws 4 rest on bottom plates 1, 1a and lean against the adjacent rubber tread or cleat (on the left of the claws 4 in FIG. 1), so that no tipping occurs when lateral pressure is exerted in curves. This bracing effect is, of course, only possible when the claws are in an extended position; when claws 4 are retracted by downward pivoting thereof, they are only held in position by the wire cables 5.

In the next adjacent row of claws (not shown) which is the exact mirror image of the row of claws shown in FIG. 1, the claws are reversely arranged so that they flip over or pivot in an opposite direction whereby when erected, they lean against the oppositely-disposed adjacent rubber tread (disposed to their right, rather than on their left as in FIG. 1). This reverse movement is aided by transverse sheet metal parts or balanced beams 15, disposed on the outer side of the tire (the operation of which will be described in greater detail hereinbelow). These parts pull the wire cables 5 at the second row in the opposite direction. Thus, every second row of the claws at least has a solid or secure position in relation to a definite side and a good adhesion to the track is obtained by the aid of the outwardly-disposed longitudinal side of claws 4.

Figure 2:
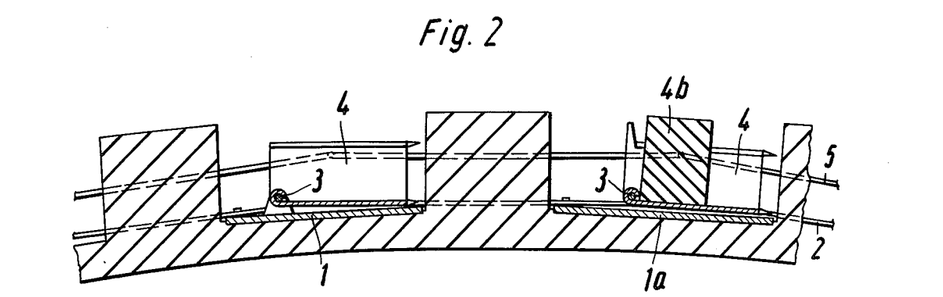
FIG. 2 shows the same claws in a retracted or flipped-over state.

One form of construction of claws 4 is shown in FIG. 1 without the vulcanized-on rubber part and the other one of which is shown with the vulcanized-on rubber part 4b for better filling of the gap in the profile. FIG. 2 shows the same tire profile section as in FIG. 1 but with the skid protective claws 4 pivoted downwardly or retracted; erection of the claws being effected by a pull on wire cables 5.

FIG. 3 is a top view of a part of the tire tread with a row of claws 4 in the same position as is shown in FIG. 1. The wire cables 2 used for fastening bottom plates 1, 1a and the wire cables 5 used for actuating claws 4, both of which run on both sides of these claws in discrete recesses provided between the rubber cleats which recesses are usually provided in snow tires.

Figure 4:
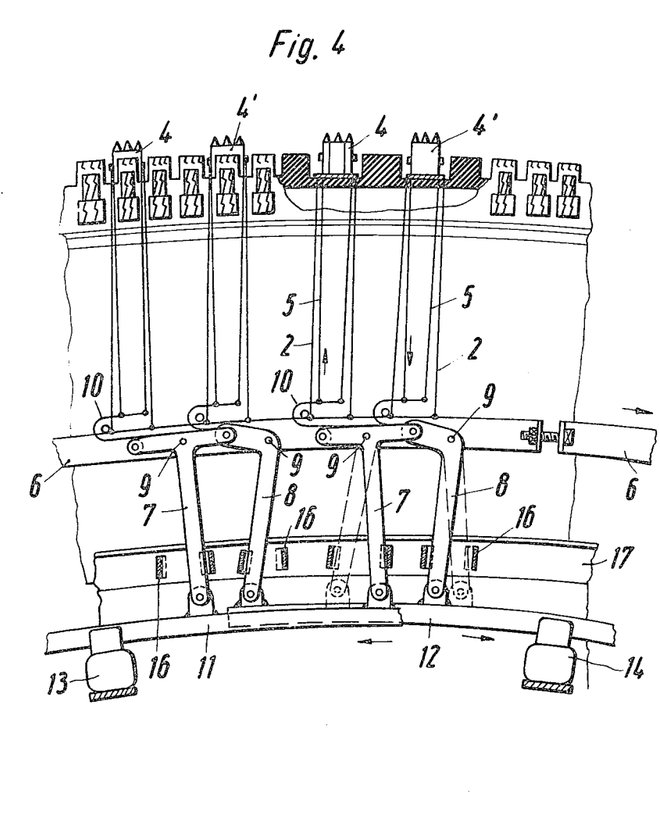
FIG. 4 is a view of the inner side of a tire with the tension bands, the claws and their means of actuation.
Figure 5:
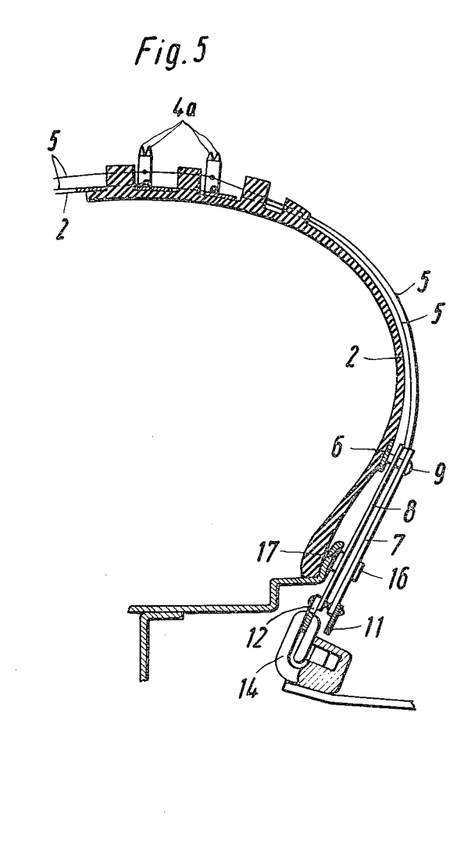
FIG. 5 is a sectional view of the inner side of the tire with the same means of drive.

FIG. 4 shows the inner side of the tire, with the actuating elements for effecting movement of claws 4; the same is shown in FIG. 5 in cross-section. The rows with claws 4' shows the mirror image of the rows with claws 4.

Figure 6:
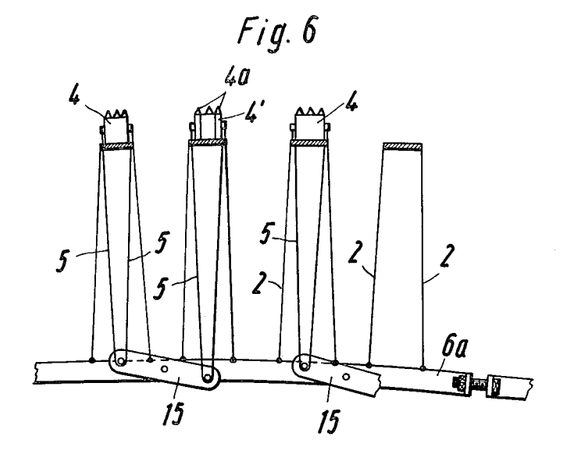
FIG. 6 shows the tension band fastened to the outer side of the tire with the bottom sheet metal plates of the claws, and the claws themselves with the wire cables which move them with the oppositely-directed lever arms.

All the wire cables 2 are fastened to a metal band or a wire-braided band 6 disposed at one side of the tire, and on the other (or outer) side of the tire, they are fastened to a band 6a (in FIG. 6). These bands 6 and 6a run around the whole tire like the inner part of a snow chain and are tightened by screws or other stretching means so strongly that they afford strong support for the bottom or base plates 1, 1a.

As shown in FIG. 4, a generally T-shaped lever arm 7 and a generally L-shaped lever arm 8, fabricated from steel sheet metal, are pivotably mounted to the band 6 by means of a pin or rivet 9. The ends of steel cables 5 of two adjacent rows of claws 4, 4' are coupled to opposite ends of the shorter leg of lever arm 7 by means of short, strong springs 10, which are mounted therebetween, so that single cables will not break when stuck or frozen for a short time such as when icing on some claws occurs. Lever arms 7 and 8 are pivotably connected to one another at adjacent ends of their shorter legs by means of a pin and a slot, or by a gear tooth system, or by small, sliding planes in such a way that when one lever arm moves, the other lever arm is forced to move in the opposite direction. Thus, the two longer legs of lever arms 7 and 8 move either towards each other or away from each other, like the two legs of tongs or scissors. The drive motion of the large leg of lever arms 7 and 8 is initiated by two slide rings 11 and 12, disposed on the inner side of the wheel and which are pivotably connected respectively to the longer legs of lever arms 7 and 8.

Two tong-shaped brake shoes or brake cylinders 13 and 14, fastened to the axial body in a suitable manner, are capable of alternately braking slide ring 11 or ring 12. Both braking means may be individually actuated by separate connections from the seat of the operator, which can be done mechanically or hydraulically. If, for example, the wheel turns towards the right in the direction of the arrow, as shown in FIG. 4, and if ring 11 is braked by brake cylinder 13, then ring 11 is shifted back slightly, in relation to the wheel (as shown in phantom line in FIG. 4), while the now freely moving ring 12 is moved towards the right (also shown in phantom line) by the scissors motion of the leg 8, and thus is shifted slightly ahead relative to the wheel.

Figure 7:
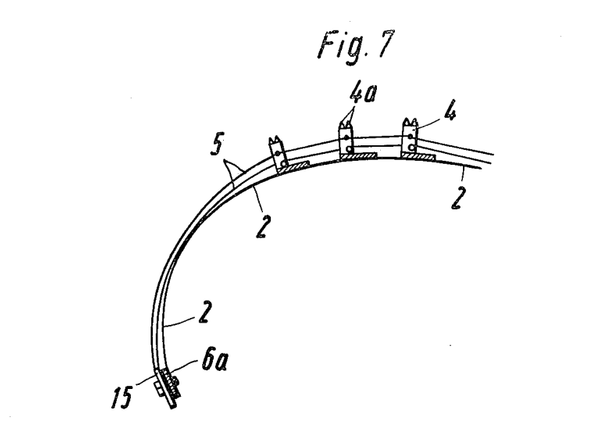
FIG. 7 shows a section of the same elements on the outer side of the tire in a sectional view, the tire itself being omitted for clarity.

In this case, cables 5 attached to the row of claws 4' are pulled downwardly by the right beam of the balance because the upper, shorter leg of lever arm 7 is built like a balance beam at whose ends two wire cables 5, each used for moving the adjacent rows of claws 4 and 4', are fastened. Simultaneously, balance beam 15, shown on the opposite side of the tire in FIGS. 6 and 7, pulls the counter cables 5, which are fastened to the adjacent rows of claws 4, upwardly on the side of the tire shown by the arrow in FIG. 4.

Due to the fact that the two rows of claws 4, 4' are arranged as their mirror images, the claws of the row 4' as well as the claws of the row 4, will simultaneously pivot when the above-described pull of cables 5 occurs (downwards at right and upwards at left). When, on the other hand, the ring 12 is braked by the brake shoe 14 and ring 11 now moves freely, the whole procedure is reversed and the claws 4 and 4a become erect again.

Strong pins 16 are disposed at the final positions of the long legs of lever arms 7 and 8, to serve as a buffer so that the ropes and lever arms are not damaged when the brakes are used too strongly and for too long a period of time. The pins 16 are fastened directly to a band 17, clamped directly onto the rim of the wheel. These pins may also be furnished with a clamping arrangement for locking the legs in either final pivotable position.

Figure 8:
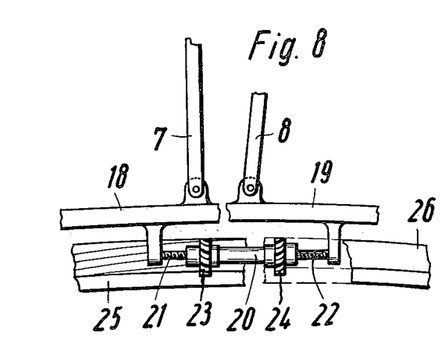
FIG. 8 is a view of another embodiment showing a highly-geared kind of motion for both rings with worm-gear drive for large tires and for trucks.
Figure 9:
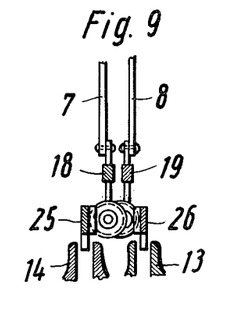
FIG. 9 shows a section of the drive of FIG. 8.
Figure 10:
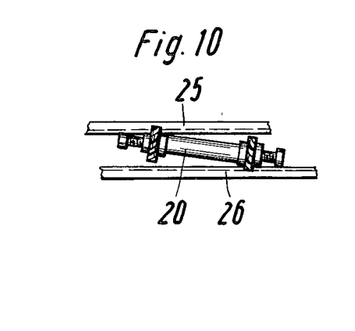
FIG. 10 illustrates in a top view the wormgear with both slide rings of the embodiment of FIG. 8.

FIGS. 8, 9 and 10 show an embodiment of the invention which is suitable for use on larger and heavier tires, particularly, those used on trucks. The long legs of lever arms 7 and 8 are pivotably mounted on two separate rings 18 and 19, respectively. These rings are not directly braked, but are connected by a pipe 20, having right-handed and left-handed threads at its ends. Upon turning, two rods 21 and 22, fastened respectively to rings 18 and 19, screw themselves respectively into and out of these threads, so that rings 18, 19 are either moved toward or away from one another, to thereby effect movement of lever arms 7 and 8. The turning of the pipe 20 is either caused by the wormgear 23, which runs in oblique, threaded grooves of the brake ring 25, or is caused by the wormgear 24, which runs in opposite grooves of the ring 26, when the latter is braked, in which case alternately one or the other wormgear 23, 24, idles upon the pipe 20.

FIG. 10 shows a top view of the pipe 20, with the two wormgears. Pipe 20 is obliquely-disposed, driven either by slide ring 25 or ring 26, depending on which of the two rings is braked by brake shoes 13 or 14.

Figure 11:
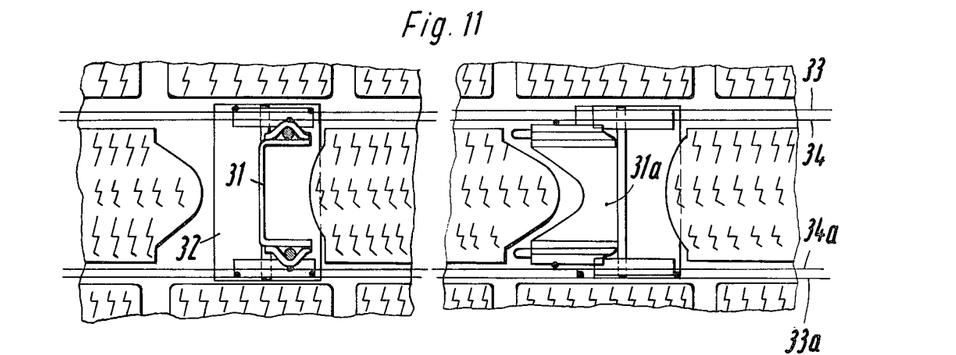
FIG. 11 is a top view of the tire tread showing an erected gripper and with a flipped-over gripper.
Figure 12:
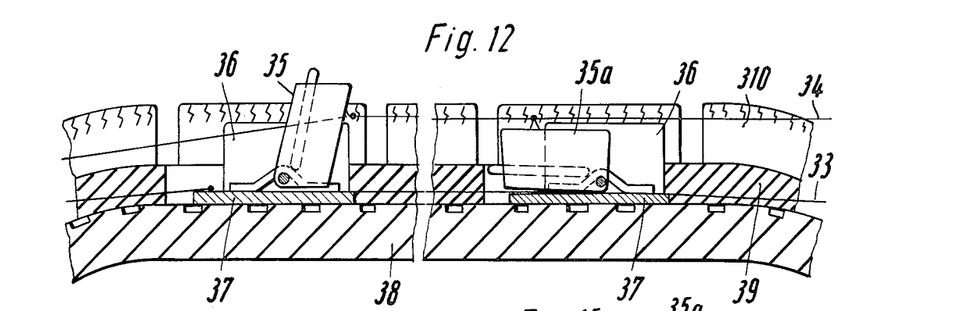
FIG. 12 is a side view of the tire according to FIG. 11 in a section having a slightly different embodiment.

Another embodiment of the claws 4, 4' shown in FIGS. 1–6 is shown in FIGS. 11 and 12, wherein an upright standing gripper 31 and a turned-down or retracted gripper 31a are disposed between the treads of the tire. The grippers 31, 31a have generally U-shaped cross-sections and include two spikes, each of which is connected by a bevelled support member which is pivotably supported upon the bottom plate 32. The particular bevelled shape of the support member, as seen more clearly in the right part of FIG. 11, permits the recesses which are hollowed out of the tire profile for insertion of the grippers 31, 31a, to be kept as small as possible. The wire cables 33 and 33a hold down the bottom plate 32, and the wire cables 34 and 34a erect the grippers or turn them down. The cables run in the grooves which are generally provided in snow tires.

Figures 17, 18, 19:
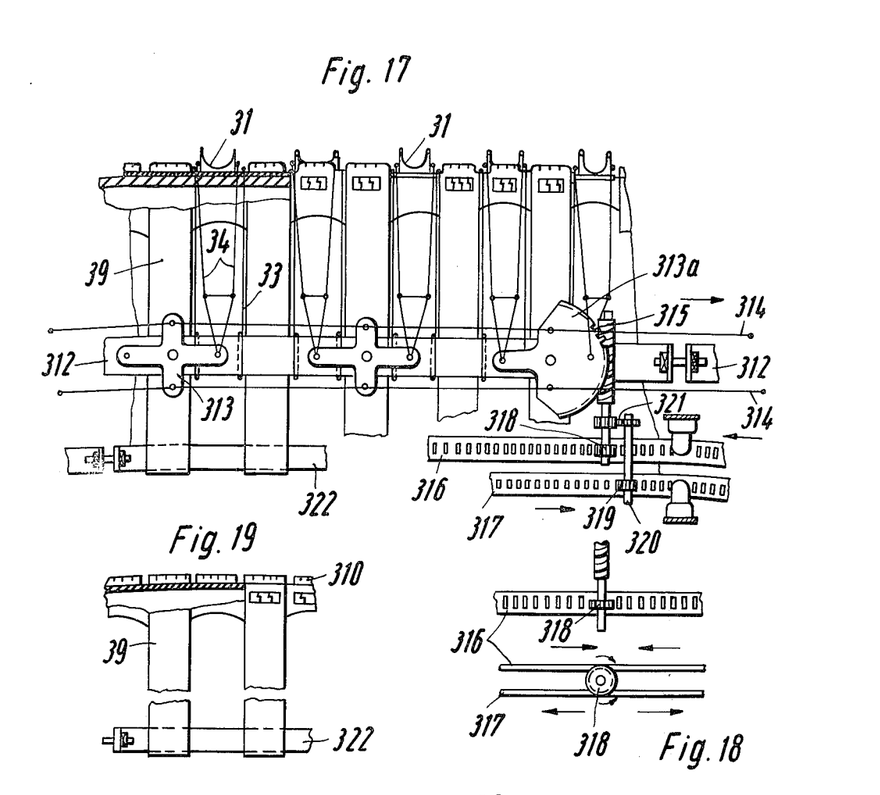
FIG. 17 shows the inner side of a tire with the motive elements for moving the gripper, which are shown in FIGS. 11 and 12.
FIG. 18 shows an embodiment of two brakes for actuating the pull cables for the grippers.
FIG. 19 shows the rubber filling only between the grippers.

A further embodiment of the claws 4, 4' is illustrated in FIG. 12, which shows a section of a part of the tire profile with a single gripper 35 with steel points. This gripper has no movable support member which pivots upwardly and downwardly with the gripper, but it is instead supported by stationary sheet metal parts 36, fixed to the bottom plate 37. A gripper in a retracted position is shown as 35a in the right part of FIG. 12. The pivoting of the gripper is also actuated by the pull cables 34. The bottom plates 37 lie directly upon the tire 38 and are held fast by the cables 33. Any suitable tire, even old and much used tires with little or no tread, may serve as tire 38. The spaces between the grippers are filled with special rubber strips or a special tire cover 39, with a high profile 310. The covers 39 are reinforced with canvas or steel wires and are disposed as bands which are laterally-extending and are longitudinally spaced along the tire circumference. The covers 39 are attached to the lateral tension bands 322 (FIGS. 17 and 19).

Figure 13:
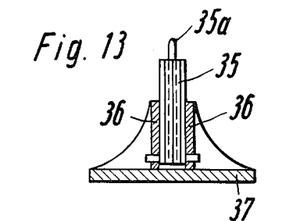
FIG. 13 is a side elevation view of a gripper in an erected position.

FIG. 13 shows in side elevation gripper 35 in an erected position, wherein a steel pin 35a is pressed and welded between two sheet metal parts pivotably supported between two sheet metal support members 36, which are, in turn, welded upon the bottom plate 37. The pull cables which may run between the support members 36 or may run along outside, are not shown for better clarity.

Figure 14:
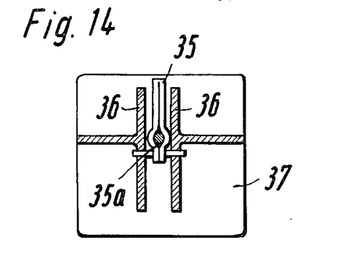
FIG. 14 is a top view of the gripper according to FIG. 13.

FIG. 14 is a top view of the same gripper 35. The adjacent interstitial rubber strips 39, both of which partly cover the bottom plate 37 with the support members 36, are not shown.

Figure 15:
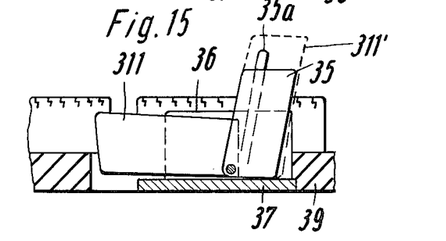
FIG. 15 is a sectional view of a part of the interstitial rubber strip with another embodiment of the gripper.
Figure 20:
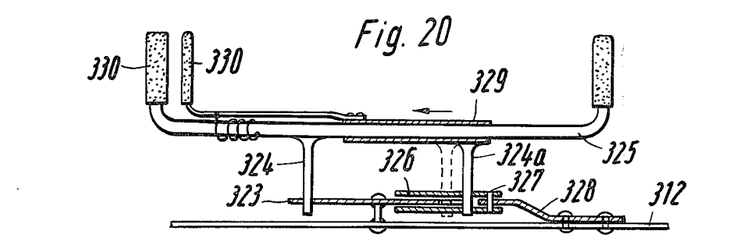
FIGS. 20 and 21 show in a side elevation and top view a spanning mechanism to be actuated by hand for erecting and lowering the grippers.
Figure 21:
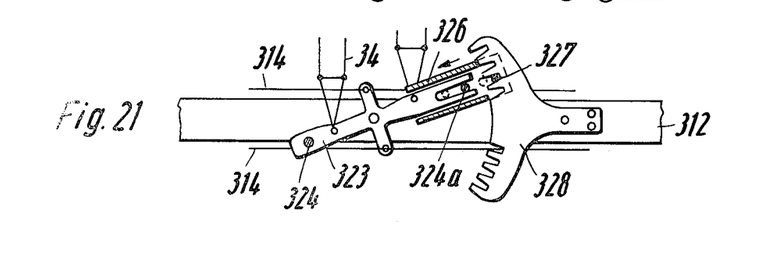

FIG. 15 shows a section of a part of the interstitial rubber strips 39 with another embodiment of the grippers. Here a gripper 311 is pivotably mounted between the support parts 36 adjacent to the gripper 35 with a steel point 35a. This gripper 311 may be considerably longer and is used only when the snow is very deep or very fluffy. In FIG. 15, gripper 35 is shown erected and gripper 311' is still in a retracted position. The erected gripper at 311' is shown in dashed lines. This gripper may have a considerably longer length because it lies in the existing grooves of the profile when turned down, thus needing no additional recess. In this embodiment, wherein two individual grippers are used, gripper 35 need not be very high because they are used only on ice or on snow packed hard by traffic. Of course, the grippers 311 must be moved by additional pull cables 34, which are actuated by additional cross-shaped lever arms 313, fabricated from sheet metal, which are pivotably mounted upon the tension bands 312. For simplicity's sake, these additional cross-shaped lever arms, which would normally be rarely used, are not installed to be regulated from the dashboard but rather are regulated by hand at the outside of the tire, as shown in FIGS. 20 and 21.

Figure 16:
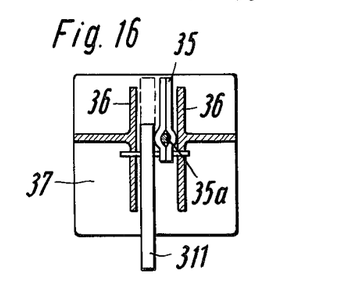
FIG. 16 is a top view of the gripper according to FIG. 15.

FIG. 16 is a top view of both grippers 35 and 311 between the support members 36. FIG. 17 shows the inner side of a tire, with the drive elements for effecting movement of the claws, i.e., grippers 31 or 35. The wire cables 33 and 34, which are fastened to the base plates 32 or 37 of the grippers are, in turn, fastened to steel- or wire-braided bands 312, which are tightly secured on both sides of the tire. The pull cables 34 are controlled by the lever arms 313, which are pivotably mounted upon the tension bands 312. The lever arms 313, as shown in FIG. 17, disposed on the inner side of the tire, are cross-shaped, while on the outer side, simple balance beams 15 are provided, which cooperate therewith to move two rows of grippers, each in opposite directions.

In the embodiment shown in FIG. 17, a plurality of lever arms 313 are actuated by the pull cables 314, which are respectively fastened to the upper and lower legs of the cross-shaped lever arms 313 and which run along the tension band 312. The cables are, in turn, fastened to and pulled by generally semi-circular-shaped lever arms 313a, pivotably mounted on band 312, which are put in motion by individual drives. Due to this construction, not all of the cross-shaped lever arms 313 have to be moved simultaneously, but only groups of three or four or, at most, half of the lever arms need be moved, i.e., only those which are connected to those grippers which are not touching the roadway; each group of cross-shaped lever arms 313 being actuated by a single, generally semi-circular-shaped lever arm 313a, fabricated from sheet metal. Lever arms 313a are advantageously actuated by a wormgear 315, meshing with an appropriate gear wheel or a toothed-rack-shaped surface provided on the curved periphery of lever arm 313a. The wormgear drive is advantageous, because it prevents at high speeds of the vehicle, a back-flipping of the retracted flippers, caused by centrifugal forces and makes it easier to hold the grippers in their desired final positions.

The wormgear 315 is put into motion by two alternately lockable brake rings 316 or 317. This occurs by the aid of gear wheels or friction gears 318 and 319, yieldably supported in such a manner, that they may slide forth like in a release clutch when the grippers meet large resistance (when they, e.g., press upon the roadway).

FIG. 17 shows an embodiment where the brake rings 316, 317 lie one over the other flatly along the wheel rim. Depending on which ring is braked and thereby pulled in a definite direction, the wormgear shaft 315 and the supplementary shaft 320 turn in opposite directions, caused by meshing paired gears 321.

FIG. 19 shows the rubber strips 39 and 310 between the grippers. The strips may be formed as an integral second tire cover or it may consist of single rubber bands which are pressed by the tension band or tension cable 322, which are disposed closely to the rim, against the normal tread like a "rubber-snow chain". The bands may also be pressed under the edge of the old tread, when shaped accordingly. When the radially running bands 39 are provided with steel inserts, they may simultaneously fasten the bottom plates of the grippers to the tire, instead of the cables 33. The heavy rubber edges of the lateral bands 39 also protect the cables when grinding against the curbstones of the street.

The rubber strips between the grippers are advantageously assembled before the application of the skid protection device in such a manner that the whole device may be applied to any tire, even a completely worn one, and may be held tightly by the lateral tension bands. This construction should be considerably cheaper than a new tire and has the advantage that the rubber strips may be raised when the profile has been worn down, so that the retracted grippers and supporting sheet metal parts may disappear within the tire profile.

FIGS. 20 and 21 show a device which makes it possible to adjust the grippers manually, also on the outer side of the tires, thereby eliminating the need for brake rings 316, 317. In this case, no connections to the dashboard are needed. This would be a less expensive construction and it is recommended for the pull cables for the optional additional grippers 311 (FIGS. 14 and 15), which are only needed for high, loose snow.

FIG. 20 shows the device with an actuating lever 325, having a pair of pins 324, 324a, which fits into the respective recesses of a specially-configured, cross-shaped member 323, fabricated from sheet metal.

FIG. 21 is a side view of the device, wherein only the pins 324 and 324a of the lever 325, can be seen.

The cross-shaped lever arms 313 and the pull cables 314 which connect them, are located on the outside of the tires so that they may be actuated by hand. Several cross-shaped lever arms 313, coupled together as a group by pull cables, are moved by an elongated, cross-shaped member 323, pivotably supported upon band 312. Cross-shaped member 323 has two opposite shorter legs, to which cables 314 are fastened, and two opposite longer legs, one of which has a hole for receiving pin 324 of lever 325, and the other of which has a slotted or forked end for slidably receiving the other pin 324a of lever 325. A slidable casing or jacket 326 is disposed on the slotted leg of member 323 and serves to lock the grippers in either their final extended or retracted position, without the need for the wormgear drive. The jacket 326 has a hole extending therethrough to permit insertion of the pin 324a into the slot of member 323. The jacket 326 is urged into continuously mating engagement by means of a spring-loaded pin 327, with the opposed recesses provided in the outer-toothed surfaces of the opposite arms of a generally Y-shaped support member 328, fastened to band 312. In order to unlock the jacket 326 from engagement with the support member 328 to, in turn, permit movement of the grippers from a retracted to an extended position, or vice versa, the second pin 324a of lever 325 is disposed upon a movable jacket or casing 329, which is urged outwardly away from its double-handle portion, by spring biasing means, while in a static or stable position.

When one wants to adjust the positions of the grippers, pin 324 of manual lever 325 is inserted into the hole of cross-shaped member 323 and pin 324a is inserted into the hole of jacket 326 and the slot of member 324. The double handles 330 of lever 325 are then pressed together, causing retraction of jacket 329 and pin 324a and, in turn, retraction of jacket 326 and pin 327 from engagement with the upper set of recesses provided in member 328 (see FIG. 21), thus unlocking the position of the grippers. As a result, the member 323 and the associated group of cross-shaped lever arms 313 coupled thereto, may be pivotably moved into another final position whereupon, upon release of the double handle grip 330, extension of casing 327 will, in turn, cause the pin 329 of casing 326, to snap into a recess on the opposite arm of member 328. Consequently, the grippers will be locked in the opposite direction (i.e., either extended or retracted).

While only several embodiments of the present invention have been shown and described, it will be obvious to those persons of ordinary skill in the art, that many changes and modifications may be made thereunto without departing from the spirit and scope of the invention.

What is claimed is:

1. A skid prevention device for tires, which tires are provided with longitudinally-and radially-extending rows of treads separated by discrete laterally-extending rows of recesses, comprising:

a plurality of elongated generally U-shaped metal claws disposed within the rows of the recesses of the tire, the outer ends of which have spikes secured thereto, and the inner ends of which are pivotably mounted in the recesses of the tire;

mounting means for pivotably mounting said inner ends of said claws in the recesses of the tire for movement between an extended position, in which said claws are extended with said spikes of said claws extending radially outwardly beyond the upper surface of the treads of the tire, and a retracted position, in which said claws are retracted, with said spikes of said claws lying below the upper surface of the treads of the tire, said mounting means including a plurality of base plates disposed within the recesses of the tire to which the inner ends of said claws are hingeable secured and a plurality of supporting cables disposed within the recesses for securing said base plates in said recesses; and moving means for pivotably moving said claws between said extended and said retracted positions and for maintaining said claws in said extended and said retracted positions thereof, said moving means including a plurality of actuating cables disposed within the recesses, at least one of which is coupled to each of the claws in one row thereof, said actuating cables being laterally reciprocable to effect pivotable movement of said row of claws.

2. The device according to claim 1, wherein adjacent rows of claws are pivotably mounted for pivotal movement in opposite directions.

3. The device according to claim 1, wherein each of said U-shaped claws has a U-shaped channel and wherein at least one of said claws in one row is provided with a rubber member mounted within its U-shaped channel which serves to fill the recess after retraction of said claw.

4. The device according to claim 2, wherein said tire has an inner side and an outer side and wherein said mounting means additionally includes a pair of tightenable metal bands, one of which is disposed on the inner side of the tire and the other of which is disposed on the outer side of the tire, and said supporting cables for fastening the base plates of each row of claws, each has two opposite ends, one end of which is fastened to one of said bands and the other end of which is fastened to the other of said bands.

5. The device according to claim 4, wherein said moving means additionally includes a plurality of balance beams each of which is pivotably secured to said band disposed on the outer side of the tire, and a plurality of paired lever arms, one of which has a generally T-shaped configuration and the other of which has a generally L-shaped configuration, and both of which include a shorter leg and a longer leg and both of which are pivotably secured to said band disposed on the inner side of the tire, with one end of the shorter leg of said T-shaped arm being pivotably secured to the end of the shorter leg of said L-shaped member, and both ends of said shorter leg of said T-shaped lever arm having a spring secured thereto, and wherein one end of said at least one actuating cable for one of said row of claws is fastened to one end of said balance beam and its opposite end is fastened to the spring secured to one end of said T-shaped member, and wherein one end of said at least one actuating cable for the adjacent row of claws is fastened to the other end of said balance beam and the opposite end is fastened to the spring mounted on the other end of said T-shaped member, whereby pivotal movement of said longer legs of said plurality of paired lever arms toward or away from one another will effect extension and retraction of two adjacent rows of claws in pivotably opposite directions.

6. The device according to claim 5, wherein said moving means additionally includes a pair of sliding rings mounted for sliding movement along the inner side of the tire radially inwardly of said lever arms, one of which is pivotably secured to the end of the longer leg of said T-shaped lever arm and the other of which is pivotably secured to the end of the longer leg of said L-shaped lever arm, and a pair of tong-shaped brake shoes mounted adjacent to said slide rings, in one of which said one ring is received and in the other of which said other ring is received, said brake shoes being alternately operable from the driver's seat by hydraulic or mechanical means.

7. The device according to claim 5, wherein said moving means additionally includes a limit band disposed on the inner side of the tire, adjacent to said lever arms, having a plurality of abutment pins extending outwardly therefrom which are disposed for engagement with said longer legs of said lever arms to limit the pivotal movement thereof.

8. The device according to claim 5, wherein said moving means additionally includes a pair of sliding rings mounted for sliding movement along the inner side of the tire radially inwardly of said lever arms, one of which is pivotably secured to the end of the longer leg of said T-shaped lever arm and the other of which is pivotably secured to the end of the longer leg of said L-shaped lever arm, a pair of threaded rods, one of which is secured to one of said rings and the other of which is secured to the other of said rings, and a pipe having left-handed threads and right-handed threads at the opposite ends thereof, into which said rods are screwed respectively into and out of, so as to effect movement of said rings and, in turn, the longer legs of said lever arms, toward and away from one another.

9. The device according to claim 1, wherein the claws in each row are disposed closely adjacent one another to minimize the open spaces therebetween and wherein said device additionally includes a removable rubber tire cover which includes laterally-extending bands insertable within the lateral recesses of said tire, which fills the spaces between said claws.

10. The device according to claim 9, wherein said tire cover includes an underlying sheet material so that after it becomes worn out, the retracted claws will not protrude above the profile of the tire.

11. The device according to claim 9, wherein said claws when pivoted to said extended position thereof, are pivoted greater than 90° so that said claws will not be forced back when used on the road, and will not retract themselves.

12. The device according to claim 9, wherein the claws in each of said rows are each separated by rubber parts and wherein said base plate includes a pair of upwardly-extending, spaced-apart side members which afford support for said claws.

13. The device according to claim 9 additionally including a plurality of grippers having a length longer than that of said claws, each of which is disposed in said lateral recesses of said tire adjacent to one of said claws and each of which has an outer end and an inner end which is pivotably mounted in said recess to permit pivotal movement of said gripper, parallel to that of said claws, between an extended position, in which said grippers are extended with said outer ends of said grippers extending radially outwardly beyond the upper surface of the treads, and a retracted position in which said grippers are retracted, with the outer ends of said grippers extending below the upper surface of the treads of the tire, and means for pivotably moving said grippers between said extended and retracted positions.

14. The device according to claim 4, wherein said moving means additionally includes a plurality of balance beams, each of which is pivotably secured to one of said bands, a plurality of cross-shaped lever arms and at least one lever, which are pivotably secured to said other band, at least one pair of pull cables which is fastened to the ends of opposite legs of at least two of said cross-shaped lever arms and to opposite ends of said lever, and drive means for pivotably moving said lever, and wherein one end of said at least one actuating cable for one of said row of claws is fastened to one end of one of said balance beams and its opposite end is fastened to one of the other opposite legs of one of said cross-shaped members, and wherein the end of said at least one actuating cable for the adjacent row of claws is fastened to the other end of said balance beam and its opposite end is fastened to the other end of said other opposite leg of said cross-shaped member, whereby pivotal movement of said lever will effect pivotal movement of at least two of said cross-shaped members so that, in turn, only the rows of claws which are not disposed upon the roadway, may be activated.

15. The device according to claim 14, wherein said lever has a generally semi-circular-shape and has a toothed profile about its curved periphery, and wherein said drive means includes a first rotatable shaft and a worm gear mounted on said first rotatable shaft and in mesh with said toothed profile of said lever, a pair of alternately lockable, slotted brake rings mounted for sliding movement radially inwardly of said lever arms, a first gear mounted on said first shaft and in meshing engagement with the slots of one of said brake rings, a second rotatable shaft and a second gear mounted on said second rotatable shaft and in meshing engagement with the slots of the other of said brake rings, and a pair of meshing third gears, one of which is mounted on said first shaft and the other of which is mounted on said second shaft.

16. The device according to claim 15, wherein said first and second gears are yieldably supported so that they may slide or jump when the claws are momentarily resting upon the roadway, or are frozen fast to it.

17. The device according to claim 14, wherein said cross-shaped lever arms and said at least one lever are pivotably secured to said band disposed on the outer side of the tire, wherein said lever has a cross-shaped configuration and has one opposite pair of shorter legs to which said pull cables are fastened and another opposite pair of longer legs, one of which has a hole formed in the end thereof and the other of which has a slotted end, said lever also including a jacket having a hole extending laterally therethrough and a spring-loaded bolt mounted adjacent to the end thereof, which jacket is slidably mounted on its slotted leg, and wherein said drive means is actuated manually and includes a generally Y-shaped support member which is fastened to said outer band adjacent to said lever and which has toothed surfaces formed on its arms which oppose said lever and are disposed for locking engagement with said bolt of said jacket thereof, said drive means also including a removable hand lever comprising a rod, the ends of which have handles formed thereon, a first elongated pin attached to said rod and extending radially outwardly therefrom, a sleeve slidably mounted on said rod having a second elongated pin extending radially outwardly therefrom, said sleeve having a handle attached thereto which is disposed adjacent to one of the handles of said rods and is coupled by spring means to said rod, said first pin being insertable within said hole formed in said end of said one longer leg of said cross-shaped lever and said second pin being insertable through said hole of said jacket and into said slot of said end of said other longer leg of said lever, so that upon pressing the closely-disposed handles of said rod and sleeve together, said second pin will be moved toward said first pin to, in turn, cause disengagement of said bolt of said jacket from said toothed surface of said Y-shaped member, whereby the positions of said claws may be adjusted.

* * * * *